United States Patent
Tsukamoto (12)

(10) Patent No.: US 7,154,894 B1
(45) Date of Patent: Dec. 26, 2006

(54) ATM CELL SERVICE APPARATUS ACCOMODATING AN ATM CELL IN AN OPTICAL ASYNCHRONOUS COMMUNICATIONS NETWORK THROUGH A NORTH AMERICA ASYNCHRONOUS COMMUNICATIONS NETWORK

(75) Inventor: Keiichiro Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 09/723,117

(22) Filed: Nov. 27, 2000

(30) Foreign Application Priority Data

Mar. 17, 2000 (JP) .............................. 2000-076245

(51) Int. Cl.
*H04L 12/28* (2006.01)

(52) U.S. Cl. ................................... 370/395.1

(58) Field of Classification Search ........ 370/352–356, 370/395.1, 395.51, 395.6, 401, 464, 466, 370/479, 389, 474; 709/249, 246
See application file for complete search history.

(56) References Cited

U.S. PATENT DOCUMENTS

| | | | | |
|---|---|---|---|---|
| 5,515,386 A | * | 5/1996 | Takizawa et al. ........... | 714/776 |
| 5,544,161 A | * | 8/1996 | Bigham et al. ............. | 370/397 |
| 5,862,136 A | * | 1/1999 | Irwin ...................... | 370/395.4 |
| 6,188,701 B1 | | 2/2001 | Tsukamoto et al. | |
| 6,247,051 B1 | * | 6/2001 | Shimada ..................... | 709/224 |
| 6,317,439 B1 | * | 11/2001 | Cardona et al. ............ | 370/503 |
| 6,359,859 B1 | * | 3/2002 | Brolin et al. ............... | 370/218 |
| 6,646,992 B1 | * | 11/2003 | Kuwahara ................... | 370/249 |
| 6,671,271 B1 | * | 12/2003 | Takemura et al. .......... | 370/352 |
| 6,765,933 B1 | * | 7/2004 | Michel et al. .............. | 370/539 |
| 6,798,779 B1 | | 9/2004 | Shimbashi et al. | |
| 6,888,791 B1 | * | 5/2005 | Ellis et al. .................. | 370/227 |
| 6,891,844 B1 | * | 5/2005 | Ueno ........................ | 370/410 |

FOREIGN PATENT DOCUMENTS

| JP | 11-122320 | 4/1999 |
|---|---|---|
| JP | 2000-013387 | 1/2000 |

OTHER PUBLICATIONS

Notice of Rejection Ground dated Jun. 14, 2005.

* cited by examiner

*Primary Examiner*—Dmitry Levitan
(74) *Attorney, Agent, or Firm*—Katten Muchin Rosenman LLP

(57) ABSTRACT

After a DS3 signal is terminated by the DS3 interface circuit, an ATM cell is extracted by an ATM cell extraction circuit from a signal input through a DS3 network after performing an ATM mapping process. The ATM cell is mapped in a SONET frame by an ATM cell/N.A. new synchronous SONET STS mapping unit, and is transmitted to a SONET. When an STS signal is input from the SONET, an STS frame is terminated in an STS demapping circuit. An ATM cell is extracted by an ATM cell extraction circuit, and is mapped in the DS3 signal and transmitted by an ATM cell/N.A. asynchronous DS3 mapping unit.

7 Claims, 14 Drawing Sheets

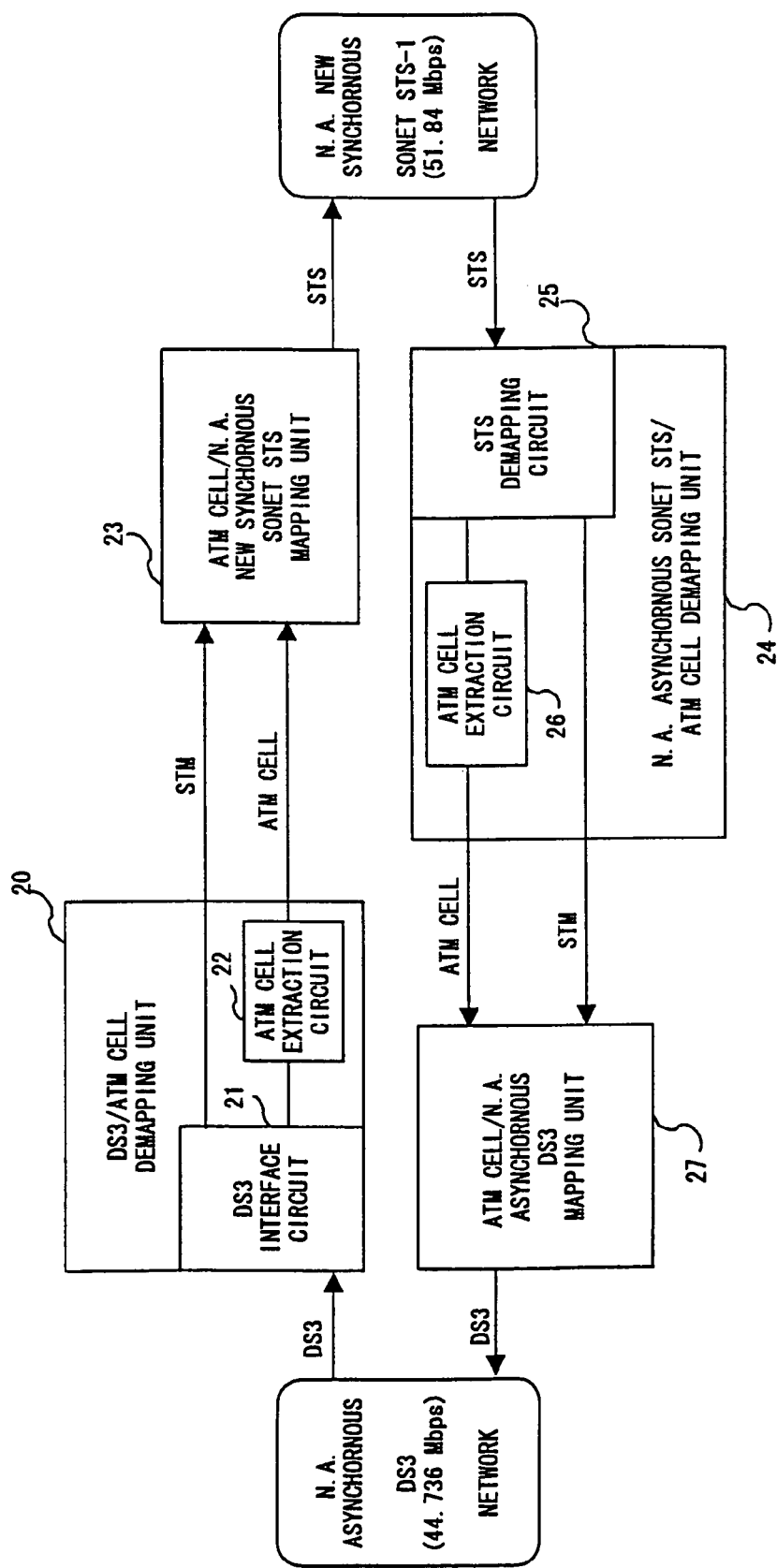
F I G. 2

FIG. 7

| Frame Format | | | C-bit | | | | | | | | | | |
|---|---|---|---|---|---|---|---|---|---|---|---|---|---|
| Rx DS3 SEL | | | | | | Idle | | | | | | | |
| AIS SEL | | | Ones | | | | through | | PDI-P | | Blue | | |
| STSSD | through | | AIS-P | | PDI-P | | | | | | AIS-P | | PDI-P |
| Detecting Alarm/ Output Signal Format | Alarm | STS Format | Alarm | STS Format | Alarm | STS Format | Alarm | STS Format | Alarm | STS Format | Alarm | STS Format | Alarm | STS Format |
| DS3 Rx Sin DWN | Rx LOS | Discard | Rx LOS | AIS-P | Rx LOS | PDI(1) | Rx LOS | Discard | Rx LOS | AIS-P | Rx LOS | PDI(1) | LOS | LOS | PDI(1) |
| DS3 Rx OOF RxOOFConv=0 | Rx LOF | Discard | Rx LOF | AIS-P | Rx LOF | PDI(1) | Rx LOF | Discard | Rx LOF | AIS-P | Rx LOF | PDI(1) |
| RxOOFConv=1 | Rx LOF | Discard | Rx LOF | AIS-P | Rx LOF | PDI(1) | Rx LOF | Discard | Rx LOF | AIS-P | Rx LOF | PDI(1) |
| All Ones RxIdleIConv=0 | Rx AIS | Discard | Rx AIS | AIS-P | Rx AIS | PDI(1) | Rx AIS | Discard | Rx AIS | AIS-P | Rx AIS | PDI(1) |
| RxIdleIConv=1 | Rx AIS | Discard | Rx AIS | AIS-P | Rx LCD | PDI(1) | Rx AIS | Discard | Rx AIS | AIS-P | Rx AIS | PDI(1) |
| Blue RxIdleIConv=0 | Rx LCD | Discard | Rx LCD | AIS-P | Rx LCD | PDI(1) | Rx AIS | Discard | Rx AIS | AIS-P | Rx AIS | PDI(1) |
| RxIdleIConv=1 | Rx Idle | Discard | Rx Idle | AIS-P | Rx Idle | PDI(1) | Rx Idle | Discard | Rx Idle | AIS-P | Rx Idle | PDI(1) |
| DS3 Rx Idle RxIdleIConv=0 | Rx Idle | Discard | Rx Idle | AIS-P | Rx Idle | PDI(1) | Rx Idle | Discard | Rx Idle | AIS-P | Rx Idle | PDI(1) |
| RxIdleIConv=1 | Rx Idle | Discard | Rx Idle | AIS-P | Rx Idle | PDI(1) | Rx Idle | Discard | Rx Idle | AIS-P | Rx Idle | PDI(1) |
| RxPLCPOOF(PLCP mode) | PL OOF | Discard | PL OOF | AIS-P | PL OOF | PDI(1) | PL OOF | Discard | PL OOF | AIS-P | PL OOF | PDI(1) |
| RxLCD | Rx LCD | Discard | Rx LCD | AIS-P | Rx LCD | PDI(1) | Rx LCD | Discard | Rx LCD | AIS-P | Rx LCD | PDI(1) |
| Unit OOS |  | Ones-P |  | Ones-P |  | Ones-P |  | Ones-P |  | Ones-P |  | Ones-P |
| Facility OOS |  | Discard |  | Discard |  | Discard |  | Discard |  | Discard |  | Discard |
| Facility Loopback |  | Discard |  | AIS-P |  | PDI(1) |  | Discard |  | AIS-P |  | PDI(1) |
| Terminal Loopback... |  | through |  | through |  | through |  | through |  | through |  | through |

Note: Discard: All of cells are discarded, and Idle cell or Unassigned cell are automatically generated.
PDI(1): Inside signal is Idle cell or depending on software setting.
through: DS3 signal passes through
STSSD-PD1 mode isn't used for ATM mode, and is used for only STM mode.
PL OOF= Rx PLCP OOF detection
---: when high layer alarm (BIF-LOS, BIF-OF, AIS-P, UNEQ-P, PLM-P) or DS3 alarm(Tx_All Ones, Tx_Blue, Tx_Idle) or Tx LCD is detected during T-LB excution, DS3 data from Down-BIF-side does not through to Up-BIF-side.
Because, DS3 data is converted according to conversion Table.
There are two conversion for Down-stream-side(Table 10.2.6) and Up-stream-side(Table 10.2.5).

FIG. 8

| Alarm | through STS Format | Ones AIS-P Alarm | Ones AIS-P STS Format | PDI-P Alarm | PDI-P STS Format | through Alarm | through STS Format | Blue AIS-P Alarm | Blue AIS-P STS Format | Blue PDI-P Alarm | Blue PDI-P STS Format | Remark |
|---|---|---|---|---|---|---|---|---|---|---|---|---|
| | | | | | | C-bit Idle | | | | C-bit Blue | | |
| Rx LOS | Discard | Rx LOS | AIS-P | LOS | PDI(1) | LOS | Discard | LOS | AIS-P | LOS | PDI(1) | |
| Rx LOF | Discard | Rx LOF | AIS-P | Rx LOF | PDI(1) | Rx LOF | Discard | Rx LOF | AIS-P | Rx LOF | PDI(1) | |
| Rx LOF | Discard | Rx LOF | AIS-P | Rx LOF | PDI(1) | Rx LOF | Discard | Rx LOF | AIS-P | Rx LOF | PDI(1) | |
| Rx AIS | Discard | Rx AIS | AIS-P | Rx AIS | PDI(1) | Rx LOF | Discard | Rx LOF | AIS-P | Rx LOF | PDI(1) | |
| Rx AIS | Discard | Rx AIS | AIS-P | Rx LCD | PDI(1) | Rx AIS | Discard | Rx AIS | AIS-P | Rx AIS | PDI(1) | |
| Rx LCD | Discard | Rx LCD | AIS-P | Rx LCD | PDI(1) | Rx AIS | Discard | Rx AIS | AIS-P | Rx AIS | PDI(1) | |
| Rx LCD | Discard | Rx LCD | AIS-P | Rx LCD | PDI(1) | Rx Idle | Discard | Rx Idle | AIS-P | Rx Idle | PDI(1) | |
| Rx Idle | Discard | Rx Idle | AIS-P | Rx Idle | PDI(1) | Rx Idle | Discard | Rx Idle | AIS-P | Rx Idle | PDI(1) | |
| Rx Idle | Discard | Rx Idle | AIS-P | Rx Idle | PDI(1) | PL OOF | Discard | PL OOF | AIS-P | PL OOF | PDI(1) | |
| PL OOF | Discard | PL OOF | AIS-P | PL OOF | PDI(1) | Rx LCD | Discard | Rx LCD | AIS-P | Rx LCD | PDI(1) | |
| Rx LCD | Discard | Rx LCD | AIS-P | Rx LCD | PDI(1) | . | . | . | . | . | . | |
| . | Ones-P | . | Ones-P | . | Ones-P | . | Ones-P | . | Ones-P | . | Ones-P | STS-1 All 1s |
| . | Discard | . | Discard | . | Discard | . | Discard | . | Discard | . | Discard | |
| . | Discard | . | AIS-P | . | PDI(1) | . | Discard | . | AIS-P | . | PDI(1) | |
| . | through | . | through | . | through | . | through | . | through | . | through | |

ATM CELL SERVICE APPARATUS ACCOMODATING AN ATM CELL IN AN OPTICAL ASYNCHRONOUS COMMUNICATIONS NETWORK THROUGH A NORTH AMERICA ASYNCHRONOUS COMMUNICATIONS NETWORK

BACKGROUND OF THE INVENTION

1. Field of the Invention

The present invention relates to an ATM cell service apparatus for multiplexing an ATM cell from an ATM network into an N.A. (North America) new synchronous signal.

| | | | |
|---|---|---|---|
| AIS | Alarm Indication Signal | SONET specification term | |
| VCXO | Voltage Controlled Xtal Oscillator | General term for a parts | Quarts oscillator of which the frequency is variable by changing applied voltage |
| DTPin | input positive data | Abbreviation employed In present patent application | |
| DTNin | input negative data | Abbreviation employed in present patent application. | |
| BIT LEAK | = memory | General term for a function | Bit by bit readjustment of fluctuation in after-destaff data timing. Called a re-timing circuit |
| PLCP | Physical Layer Convergence Procedure | SONET specification term | |
| RDIL | Line Remote Defect Indication | SONET specification term | |
| ISID | IDLE signal indication | SONET specification term | Name of a signal In LAPD data-link using bits of DS3 Cbit frame |
| FEAC | Far End Alarm and Control | SONET specification term | |

2. Description of the Related Art

Conventionally, there have been known a multiplexing device for accommodating an N.A. asynchronous communications network signal in an N.A. new synchronous network (SONET: synchronous optical network, refer to ANSI TI-105) and a new synchronous communications network according to the standards of the TTC (Telecommunication Technology Committee)(refer to JT-G707, JT-807, and JT-709), or a multiplexing device for accommodating an ATM (asynchronous transfer mode) cell in the N.A. asynchronous communications network (PDH: plesiochronous digital hierarchy network).

Recently, there are an N.A. asynchronous signal network (hereinafter referred to as a DSn network) and an N.A. new synchronous (SONET) signal network (hereinafter referred to a SONET) in an N.A. transmission network.

When the DSn network is connected to the SONET, a SONET optical transmission device is used. However, although a device for connecting a network (hereinafter referred to as a DS3 network) of a DS3 (44.736 Mbps) signal to a network (hereinafter referred to as a SONET STS-1) capable of performing a multiplexing/demultiplexing process in a SONET in an STS-1 (51.84 Mbps) signal unit has been put to practical use, a device for connecting an STM and ATM cell in a DS3 (44.736 Mbps) signal to a network capable of flexibly multiplexing/demultiplexing in a SONET in an STS-1 (51.84 Mbps) signal unit has not been put to practical use.

Only the SONET is described below, but the correspondence between the SONET and the TTC standards can be clearly understood.

Recently, there is a strong demand for a device capable of multiplexing/demultiplexing an ATM cell in an STS-1 unit while operating an N.A. asynchronous DS3 STM network, and entering the N.A. new SONET from the ATM network.

In this case, in a method of combining the conventional STM device with an ATM device, the entire device becomes large both in size and power consumption. In addition, in a method of generating an output AIS signal when an alarm signal is detected, the entire circuit becomes larger in size and power consumption if the conventional method used on the SONET side is adopted as is.

SUMMARY OF THE INVENTION

The present invention aims at providing an ATM cell service apparatus capable of providing an ATM cell service in a device for supporting an N.A. new synchronous network.

The ATM cell service apparatus which accommodates an ATM cell in an optical synchronous communications network through an N.A. asynchronous communications network according to the present invention includes: an optical synchronous communications network signal terminating unit for terminating a signal in an optical synchronous communications network; an N.A. asynchronous communications network signal terminating unit for terminating a signal in an N.A. asynchronous communications network; an ATM cell extraction unit for extracting an ATM cell from a signal of the optical synchronous communications network or a signal of the N.A. asynchronous communications network; an ATM cell mapping unit for mapping an ATM cell extracted by the ATM cell extraction unit in a signal of the N.A. asynchronous communications network or the optical synchronous communications network; and a signal transmission unit for transmitting a signal of the N.A. asynchronous communications network in which the ATM cell is mapped, or a signal of the optical synchronous communications network in which the ATM cell is mapped.

The ATM cell service method in which an ATM cell is accommodated in an optical synchronous communications network through an N.A. asynchronous communications network according to the present invention includes: (a) a step of terminating a signal in an optical synchronous communications network; (b) a step of terminating a signal in an N.A. asynchronous communications network; (c) a step of extracting an ATM cell from a signal of the optical synchronous communications network or a signal of the N.A. asynchronous communications network; (d) a step of mapping an ATM cell extracted in step (c) in a signal of the N.A. asynchronous communications network or the optical synchronous communications network; and (e) a step of transmitting a signal of the N.A. asynchronous communications network in which the ATM cell is mapped, or a signal of the optical synchronous communications network in which the ATM cell is mapped.

Conventionally, there have been an interface between an optical synchronous communications network and an N.A. asynchronous communications network, and an interface between an N.A. asynchronous communications network and an ATM network. However, there has not been a connection device between an ATM network and an optical synchronous communications network through an N.A. asynchronous communications network.

The present invention provides a method of mapping an ATM cell in a signal of an asynchronous communications network, and provides an ATM cell service in an asynchronous communications network.

According to the present invention, an optical synchronous communications network refers to a SONET, an SDH network, a network according to the TTC standards in Japan, etc.

BRIEF DESCRIPTION OF THE DRAWINGS

FIG. 2 shows the configuration of the outline of an ATM cell service apparatus according to an embodiment of the present invention;

FIG. 7 is a table (1) of the process performed when an AIS/BLUE signal is detected when an ATM cell is mapped in a DS3 signal;

FIG. 8 is a table (2) of the process performed when an AIS/BLUE signal is detected when an ATM cell is mapped in a DS3 signal;

DESCRIPTION OF THE PREFERRED EMBODIMENTS

Figure 1:
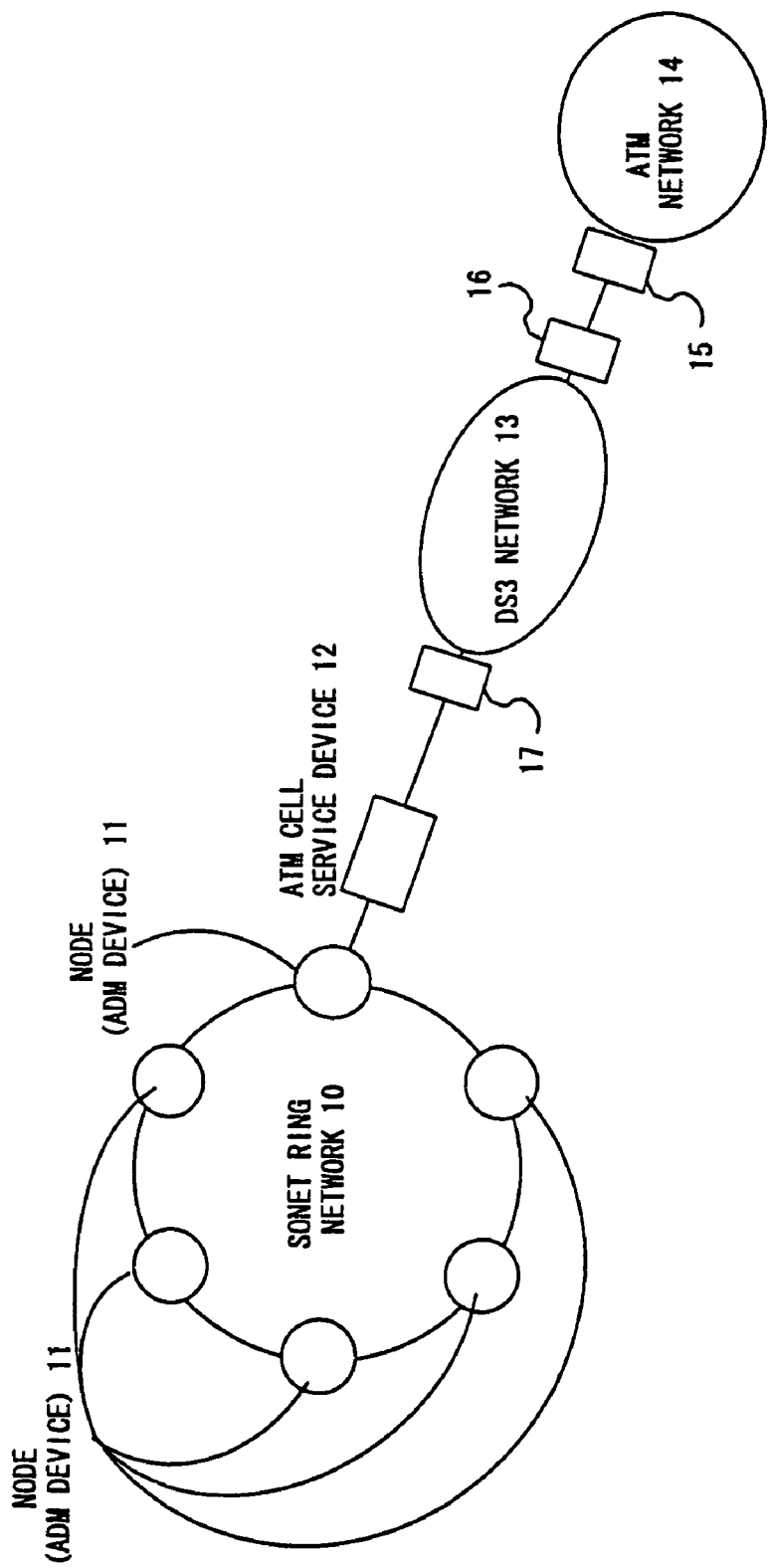
FIG. 1 shows the relationship between an ATM cell service apparatus and various networks according to the embodiments of the present invention.

FIG. 1 shows the relationship between an ATM cell service apparatus and various networks according to an embodiment of the present invention.

A DS3 network 13 is very popular in North America, and there is a strong possibility that it continues to be popular in the future. On the other hand, an ATM network 14 has recently been substantially realized. By providing an interface device between a boundary device 15 (at the boundary between the ATM network 14 and another network) of the ATM network 14 and a boundary device 16 on the boundary device 15 side of the DS3 network 13, the boundary device 15 and the DS3 network 13 can communicate with each other.

Furthermore, a SONET in which an optical signal is used as a transmission signal has recently been realized. A SONET is frequently used in the form of a ring. FIG. 1 shows a SONET ring 10 in which a plurality of nodes (ADM devices (add/drop multiplexers) are connected in the form of a ring. When communications are established with the SONET ring 10, it is necessary to input a signal from a node 11. Furthermore, to receive a signal from the SONET ring 10, it is necessary to receive a signal extracted from any node 11. Then, a boundary device 17 on the SONET ring 10 side of the DS3 network 13 is connected to the node 11 through an interface.

In this case, an interface device for mapping a signal of the DS3 network 13 in the signal of the SONET ring 10 has been provided in the conventional technology. However, there has been no device for mapping an ATM cell of the ATM network 14 connected to the DS3 network 13 directly in the signal of the SONET ring 10.

An ATM cell service device 12 according to an embodiment of the present invention, provided in the node 11 which is a node of the SONET ring 10, or outside the node 11 as an interface portion between the node 11 and the boundary device 17 of the DS3 network 13, transfers an ATM cell of the signal of the DS3 network 13 in which ATM cells are mapped to a signal of the SONET ring 10, or maps an ATM cell of a signal of the SONET ring 10 in which ATM cells are mapped in the signal of the DS3 network 13.

FIG. 2 shows the configuration of the outline of the ATM cell service apparatus according to an embodiment of the present invention.

In FIG. 2, a DS3 (44.736 Mbps) signal input from an N.A. asynchronous DS3 network terminates the DS3 signal in a DS3 interface circuit 21 of a DS3/ATM cell demapping unit 20, and an ATM cell is extracted from the DS3 signal. An ATM cell/N.A. new synchronous SONET STS mapping unit 23 maps an ATM cell in a SONET STS signal. At this time, if the DS3 signal is an STM (synchronous transfer mode) signal, the ATM cell extraction circuit 22 for extracting an ATM cell from a DS3 signal is bypassed.

On the other hand, an STS signal input from the N.A. new synchronous SONET terminates an STS-1 signal in an STS demapping circuit 25 of an STS/ATM cell demapping unit 24, and an ATM cell is extracted from the STS signal. At this time, if the STS signal is an STM signal, the ATM cell extraction circuit 26 for extracting an ATM cell from an STS signal is bypassed. An ATM cell/N.A. asynchronous DS3 mapping unit 27 maps an ATM cell in the DS3 signal. If the STM signal is mapped by the STS signal, then it is mapped as is in the DS3.

As described later, according to an embodiment of the present invention, a smaller circuit can be realized without adding an oscillator by using a VCXO, fluctuating only for the deviation of the VCXO which is a local oscillator as a frequency fluctuation even when an alarm signal is generated, for an ATM mode. In an STM mode a VCXO is used for multiplexing a cell in an ATM mode so that the frequency of the output AIS signal can be stabilized when an alarm signal is detected on the SONET side to realize the ATM cell service apparatus using a DS3 signal.

Figure 3:
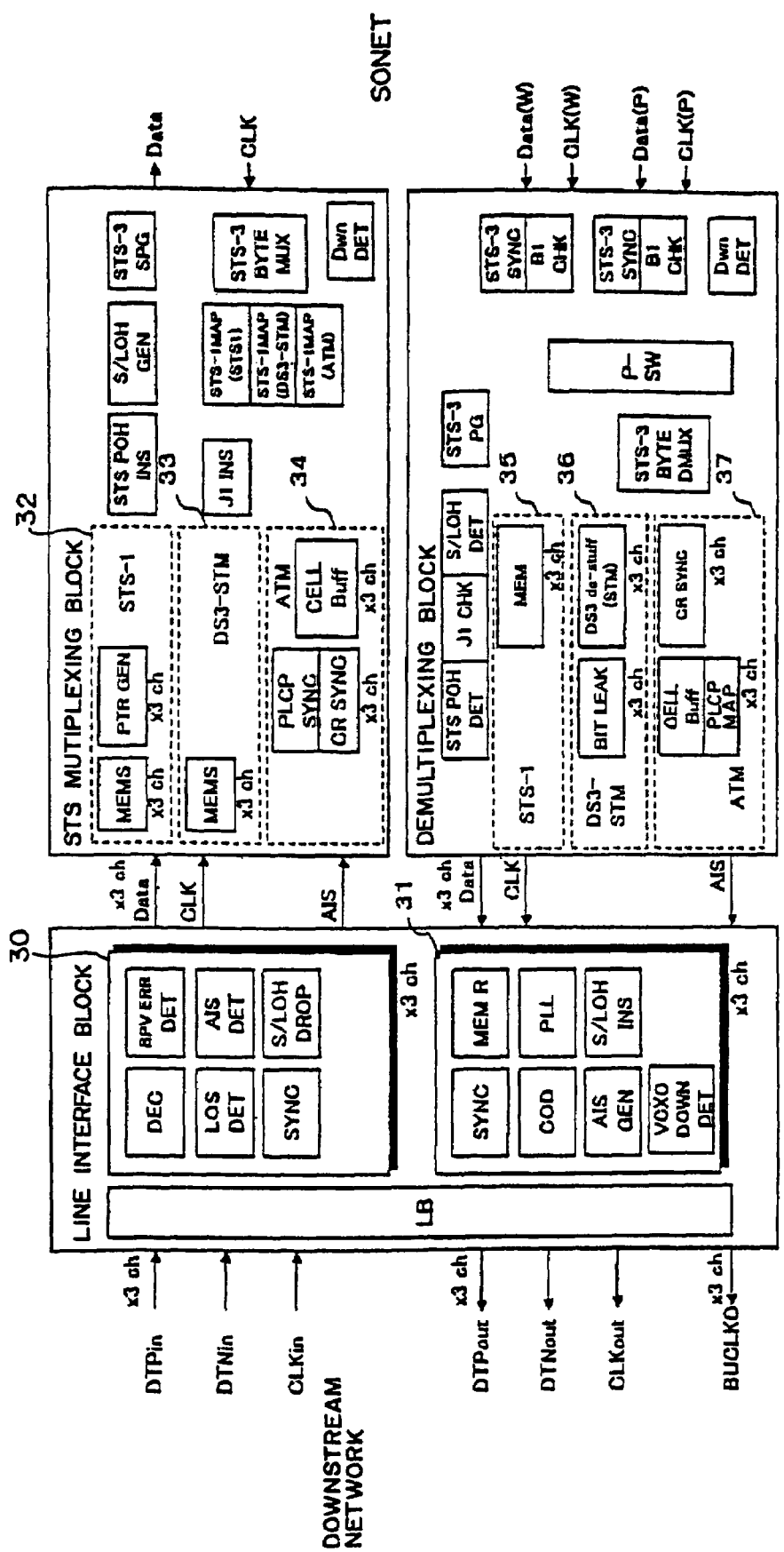
FIG. 3 is a block diagram of the entire configuration of an ATM cell service apparatus according to an embodiment of the present invention.

FIG. 3 is a block diagram of the entire configuration of the ATM cell service apparatus according to an embodiment of the present invention.

In FIG. 3, the block described as x3ch shows the same configuration for 3 channels. The embodiment described below is not limited to the connection between a DS3 network and a SONET as shown in FIG. 2, but can be applied to the connection between a SONET and another SONET, the connection between a DS3 network and a SONET, and the connection between an E3 network and a SONET. Therefore, a SONET is defined as an upstream network, and a SONET network or a DS3 network, or an E3 network to be connected to the upstream SONET is defined as a downstream network.

A DTPin input to the line interface block from the left as shown in FIG. 3 is a positive signal of a downstream network. A DTNin is a negative signal of a downstream network. A CLKin is a clock signal transmitted together with a positive signal and a negative signal.

When these signals are input to the line interface block, they first pass through a block LB for loopback transfer. The block LB is used when a signal is looped back if a fault occurs, etc. As a downstream network signal is looped back, an upstream network signal can be looped back in a block LB as necessary. When no signals are looped back in the block LB, a signal from the downstream network is input to a block 30.

In block 30, a signal is decoded in a block DEC, and it is determined whether or not the decoded signal has a bit error in a block BPV ERR DET. Then, it is determined whether or not a signal is missing in a block LOS DET. In addition, it is determined whether or not a signal contains an alarm indication signal, that is, whether or not an error is contained in the decoded signal information in an AIS DET. In a block SYNC, it is determined whether or not the synchronization with the DS3 signal is attained. If not, it is determined that a received signal has not been correctly received. Furthermore, if the synchronization is attained with the DS3 signal, and the signal is correctly received, then a section overhead and a line overhead are extracted in a block S/LOH DROP.

Thus, a DS3 signal input to a line interface block is processed in each of the above mentioned blocks, and input as data to an STS multiplexing block. At this time, a clock signal and an AIS signal are input to the STS multiplexing block with the data.

In the STS multiplexing block, a process is assigned depending on the type of input data. That is, if an input DS3 signal is obtained by mapping the STS-1 signal, then a signal is input to a block 32. The block 32 stores a signal in memory MEMS, and outputs it at a predetermined clock to perform a destuffing process. Furthermore, a pointer for adjustment of a phase shift of an STS-1 frame which is a signal format of a SONET in a block PTR GEN is generated, and embedded and output in a signal.

When a signal input to the STS multiplexing block is a signal obtained by mapping an STM signal in a DS3 signal, the bit rate is converted in the memory MEMS, and is then output.

When a signal input to the STS multiplexing block is a signal obtained by mapping an ATM cell in a DS3 signal, the PLCP (physical layer convergence protocol) frame, which is a predetermined format for mapping an ATM cell in the DS3, is synchronized in the blocks PLCP SYNC and CR SYNC, and furthermore, an ATM cell is synchronized using a CR byte. Then, the ATM cell is input to a block CELL Buff. The block CELL Buff is a buffer, and outputs an input ATM cell at a timing for matching a bit rate of the STS-1 signal.

Thus, when a signal matching the bit rate of the STS-1 signal is generated, a path overhead is inserted into these signals in the block STS POH INS, and a J1 byte of an identifier indicating the head of a frame is inserted into a path overhead in the block J1 INS. In the block S/LOH GEN, a section overhead and a line overhead are generated, and added to the signal generated as described above into an STS-1 signal in the block STS-1 MAP. The STS-1 signal is multiplexes by 3 channels into an STS-3 signal in the block STS-3 BYTE MUX. Then, in the block STS-3 SPG, a clock signal to be transmitted with the STS-3 signal is generated, and transmitted with the generated STS-3 signal.

The block Dwn DET has the function of determining whether or not a synchronous clock signal input from a SONET has been down.

A signal input from the SONET is first input to an STS demultiplexing block. In FIG. 3, signals of the current circuit (WORK) and a standby circuit (PROTECTION) are input. Each of the current circuit and the standby circuit comprises a circuit for transmitting data and a circuit for transmitting a clock signal. Therefore, in the STS demultiplexing block, a block STS-3 SYNC is provided for both current and standby circuits to determine whether or not the synchronization of the STS-3 signal is correct. In addition, using a B1 byte of an STS-3 frame, a block B2 CHK is provided for both current and standby circuits to check whether or not a signal error occurs in the STS-3 frame. As described above, the block Dwn DET has the function of determining whether or not a synchronous clock signal input from a SONET has been down.

A block STS-3 PG is a block in which a pulse synchronous with the STS-3 signal of the SONET is generated. A block P-SW is a protection switch for switching the current and standby circuits input from the SONET. The input STS-3 signal is demultiplexed into STS-1 signals in the block STS-3 BYTE DMUX. The path overhead of the demultiplexed signals is detected in the block STS POH DET. A J1 byte is checked in the block J1 CHK. In the block S/LOH DET, a section overhead and a line overhead are detected.

When the data obtained from the STS-1 signal is data in which other protocols are not mapped, it is input to a block 35, and stored in the memory MEM. Then, it is read at a speed matching the bit rate of the DS3 signal from the memory MEM, and is transmitted to the line interface block.

When the data obtained from the STS-1 signal is obtained by mapping an STM signal, it is input to a block 36. In the block 36, the DS3 signal is destuffed, and a small discrepancy from a synchronous signal is amended. Furthermore, a signal obtained after the destuffing process is input to a block BIT LEAK, and the fluctuation in the bit rate of a signal caused by removing a header from the STS-1 is amended, and the resultant signal is output to a line interface block.

When the data obtained from the STS-1 signal is obtained by mapping an ATM cell, it is input to a block 37. In the block 37, it is checked in the clock CR SYNC. In the block PLCP MAP, an ATM cell is mapped in the PLCP format, and transmitted in the line interface block.

In addition to the data obtained as described above, a clock signal and an AIS are input from an STS demultiplexing block to a block 31 of the line interface block.

In block 31, a desired clock signal is obtained by adjusting the frequency in the clock PLL. A block VCXO DOWN DET has the function of detecting whether or not a local oscillator is down.

The data input from the STS demultiplexing block to the line interface block is stored in the memory MEM R, read according to a clock signal generated in the block PLL, and obtained as a signal at a bit rate matching the bit rate of the DS3 signal. Furthermore, in the block S/LOH INS, a section overhead and a line overhead are inserted, the synchronization of the generated DS3 signal is checked in the block SYNC, the signal is coded in the block COD, and is then output.

Thus, the coded DS3 signal is transmitted to the downstream network through the block LB.

FIGS. 4 through 9 show the detailed configuration of the interface device on the upstream side for processing a signal from the downstream network of the ATM cell service apparatus according to an embodiment of the present invention to the SONET.

Described below is the process performed on one channel, but three channels are installed on one chip according to an embodiment of the present invention.

Figure 4:
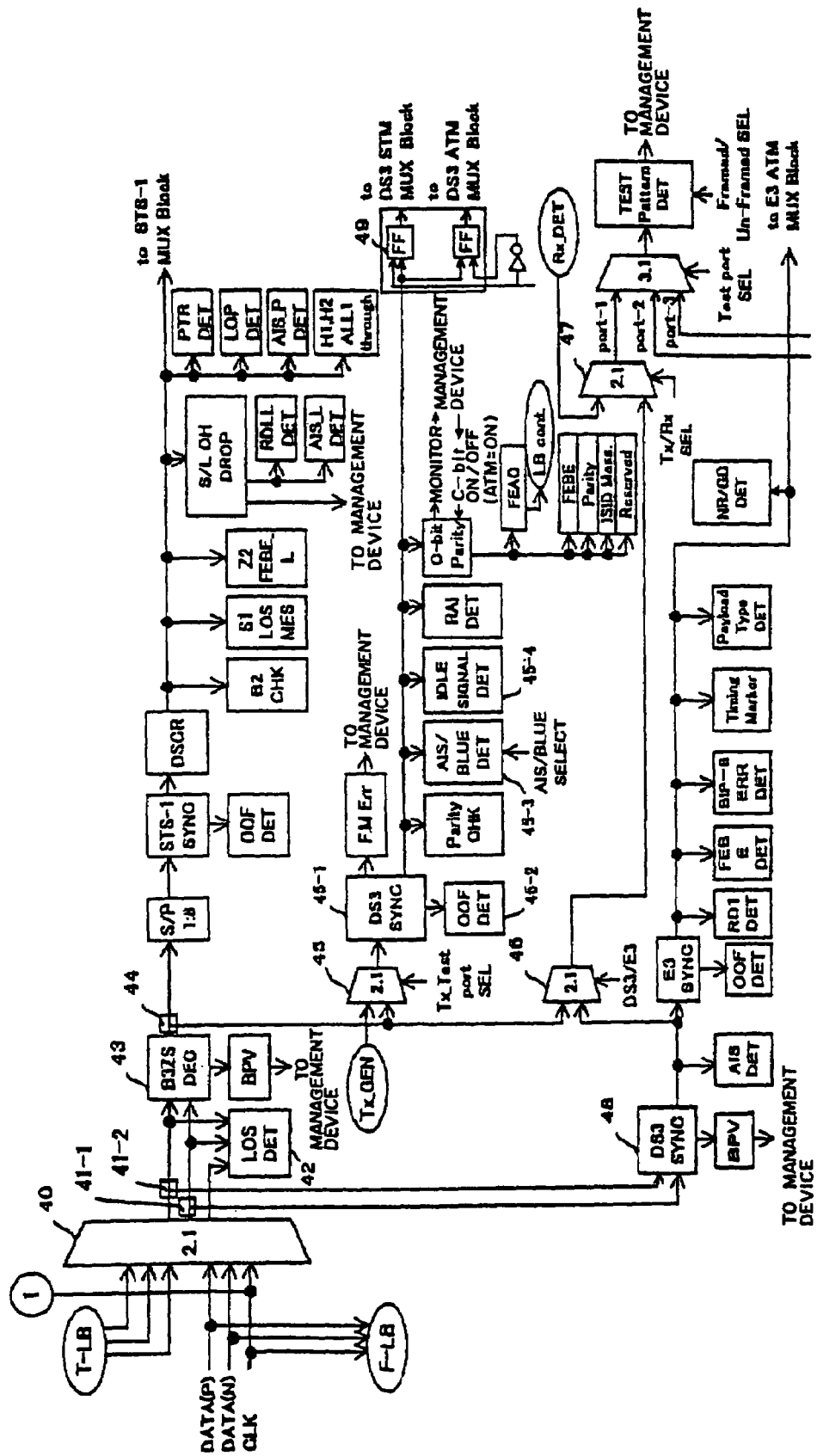
FIG. 4 shows the detailed configuration (1) of the interface device for processing a signal from a downstream network to a SONET in the ATM cell service apparatus according to an embodiment of the present invention.

FIG. 4 shows the configuration of the half of the downstream network side of the interface device for one channel, and it is assumed that a downstream signal converted into a digital signal is input from the left as shown in FIG. 4. First, from the downstream network side, the positive data DATA (p), negative data DATA (n), and a clock CLK are input. A selector 40 selects the normal input data or the data input from the T-LB shown in FIG. 4 when a signal is looped back, and outputs the selected data. The input data is branched to either a branch 41-1 or 41-2. When an ATM cell is mapped in the E3 format in the downstream data, the data is output to the lower side shown in FIG. 4. Otherwise, the data is output to the left side. In this switching process, when a user uses the ATM cell service apparatus according to an embodiment of the present invention, it is first determined whether or not an ATM cell is used in the E3 format, and it is determined in which direction the downstream signal input to the apparatus is to be transmitted from the branches 41-1 and 41-2. The branches 41-1 and 41-2 normally comprise two flipflops and an enable signal. By inputting an enable signal to one flipflop and inputting a signal obtained by logically inverting the enable signal to another flipflop, a signal can be transmitted only to one flipflop. In the subsequent drawings and descriptions, when a branch portion is indicated by a rectangle, it indicates the configuration similar to those of the branches 41-1 and 41-2.

When a signal is output to the left side shown in FIG. 4 from the branches 41-1 and 41-2, the signal is input to a LOS (loss of signal) determination unit 42. In this case, it is determined whether or not a signal has a defect. Furthermore, the signal is input to a decoder 43 and decoded, and a bit error is detected by a and decoding result bit error detection unit BPV. The detection result is transmitted to a management device not shown in FIG. 4.

The decoded signal is transmitted to the left side shown in FIG. 4 when the downstream signal is an STS-1 signal at a branch 44, and transmitted to the lower portion shown in FIG. 4 when the signal is obtained by directly mapping an STM or by mapping an ATM.

When a downstream signal is an STS-1 signal, it is converted into a parallel signal by a serial/parallel conversion unit S/P, and input to a synchronization detection unit STS-1 SYNC of an STS-1 signal. The result detected by the synchronization detection unit STS-1 SYNC is input to an out of frame determination unit OOF DET to determine whether or not an out of frame state has arisen.

Then, the signal is input to a descrambling unit DSCR, descrambled, and output. A B2 byte check unit B2 CHK checks a B2 byte, and an S1 byte check unit S1 LOSMES checks an S1 byte message. A Z2 byte check unit Z2 FEBE_L checks the FEBE (far end block error) of a line overhead to determine whether or not an error has occurred. Furthermore, a section/line overhead extraction unit S/LOH DROP extracts a section overhead and a line overhead from a signal. The data of these overheads is transmitted to a management device, and an opposite station alarm detection unit RDI_L DET detects the opposite station alarm information about a line overhead. An AIS detection unit AIS_L DET detects the AIS of a line overhead.

Furthermore, in the next stage, a pointer detection unit PTR DET detects a pointer. A loss of pointer detection unit LOP DET detects a loss of pointer state. An AIS_P detection unit AIS_P DET detects the AIS of a path overhead. Furthermore, an H1 and H2 detection unit determines whether or not H1 and H2 bytes are set to all 1. When the H1 and H2 bytes are set to all 1, it is determined that the STS-1 signal currently being processed is an error signal.

Then, at a branch 44, when a signal is transmitted to the lower portion shown in FIG. 4, the signal is input to selectors 45 and 46. The selector 45 selects either inputting a test pattern signal from a test pattern generation unit described later, or inputting a normal signal from a downstream network. When a test pattern signal is transmitted, the selector 46 selects whether or not the test pattern signal is input to the test pattern detection unit TEST Pattern DET.

When the selector 45 selects a normal signal from a downstream network, the signal is input to the DS3 synchronization unit DS3 SYNC. A DS3 synchronization unit DS3 SYNC 45-1 detects a synchronization state of a DS3 signal as in the case of the STS-1, and an out of frame detection unit OOF DET 45-2 determines whether or not an out of frame state of a DS3 signal has occurred. A frame error detection unit F.M. Err determines whether or not an error has occurred in a bit string of a frame. The result is transmitted to the management device.

A signal whose synchronization has been detected by the DS3 synchronization unit is parity-checked by a parity check unit Parity CHK, and then an AIS/BLUE signal detection unit AIS/BLU DET 45-3 detects a state of the generation of a signal fault. A user selects and sets whether an AIS signal is used or a BLUE signal is used. The use of a BLUE signal is similar to that of an AIS signal. The BLUE signal is a signal specific to the DS3, and is in accordance with the BELLCORE Standards GR 499-CORE 10.5.1.1. Furthermore, an idle signal detection unit IDLE SIGNAL DET 45-4 determines whether or not the signal being processed is an idle signal. A RAI detection unit RAI DET detects an alarm of an opposite station at the RAI byte of the DS3 signal as in the case of the RDI of the STS-1.

The C bit parity detection unit C-bit Parity detects the parity in the C bit format depending on whether or not the DS3 signal is a C bit format signal in which a DS1 signal is directly mapped. A user obtains the information about whether or not the DS3 signal input to the ATM cell service apparatus according to the present embodiment uses the C bit format, and sets whether or not the management device not shown in FIG. 4 instructs the operation of the C bit parity detection unit C-bit Parity. When the C bit parity detection unit C-bit Parity is operating, an ISID message about an opposite station alarm information FEAC, a block error FEBE, a C bit format parity, what has transmitted the signal, etc. is detected using the C bit format. The FEAC has the function of looping back a signal when an alarm signal is issued by an opposite station. Whether or not a looping back process is performed is transmitted to a loopback controller LB cont not shown in FIG. 4.

The signal is input to a branch 49. At branch 49, a user sets an FF (flipflop) depending on whether the DS3 signal has been obtained by mapping an STM signal or an ATM cell, and outputs it from the FF.

When a signal is output at the branches 41-1 and 41-2 toward the lower portion shown in FIG. 4, it indicates that an ATM cell is mapped in the E3 format. In this case, the signal is decoded by a decoder 48, and it is determined whether or not the bit error detection BPV has detected a bit error. The determination result is transmitted to a management device not shown in FIG. 4. Then, the signal is detected by the AIS detection unit AIS DET, and it is determines whether or not a fault has occurred.

Then, the E3 synchronization unit E3 SYNC detects the synchronization state in the E3 format, and the out of frame detection unit OOF DET determines whether or not an out of frame state has occurred. Then, the RDI detection unit RDI DET detects an opposite station alarm, the FEBE detection unit detects a block error, and the BIP-8 error detection unit BIP-8 ERR DET determines whether or not a bit error has occurred. Then, a timing marker of the E3 format is detected, a payload type is detected by a payload type detection unit Payload Type DET, and an NR/GC detection unit NR/GC DET detects the NR byte and the GC byte which contain the maintenance information about the E3 format.

The selector 46 selects either a signal input from the decoder 43 or a signal input through a decoder 48 depending on format of the test pattern, in the DS3 format or in the E3 format, transmitted from the test pattern generation unit described later, and inputs the selected signal to a test pattern detection unit TEST Pattern DET. A selector 47 selects a test signal input from the downstream network side or a test signal input from the upstream network side to input a selected signal to the test pattern detection unit TEST Pattern DET. The test pattern detection unit TEST Pattern DET receives any of the test signals for 3 channels installed on 1 chip.

Figure 5:
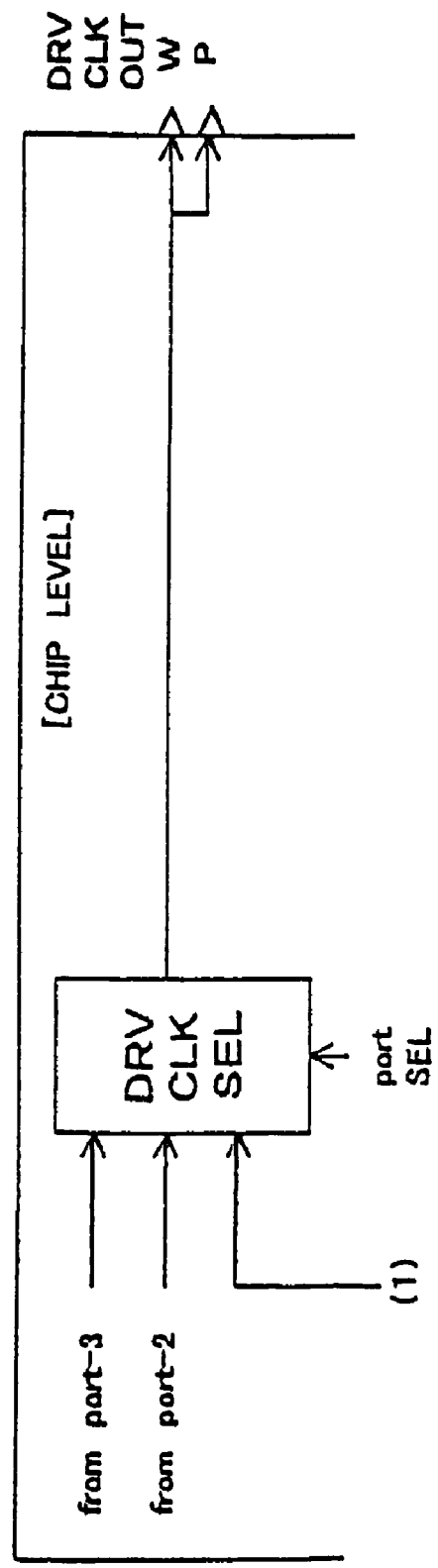
FIG. 5 shows the detailed configuration (2) of the interface device for processing a signal from a downstream network to a SONET in the ATM cell service apparatus according to an embodiment of the present invention.

FIG. 5 shows the configuration of the clock selection circuit.

The interface device shown in FIG. 4 is installed using 4 channels on 1 chip, and a circuit shown in FIG. 5 is provided on the chip outside the interface device. The circuit shown in FIG. 5 receives a clock signal along 3 channels from the downstream network shown in FIG. 4, selects any clock through a drive clock selector DRV CLK SEL of the interface device, and outputs it as a drive clock. That is, the interface device along 3 channels mounted on 1 chip can be operated commonly using the most precise clock signals of the three channels.

Figure 6:
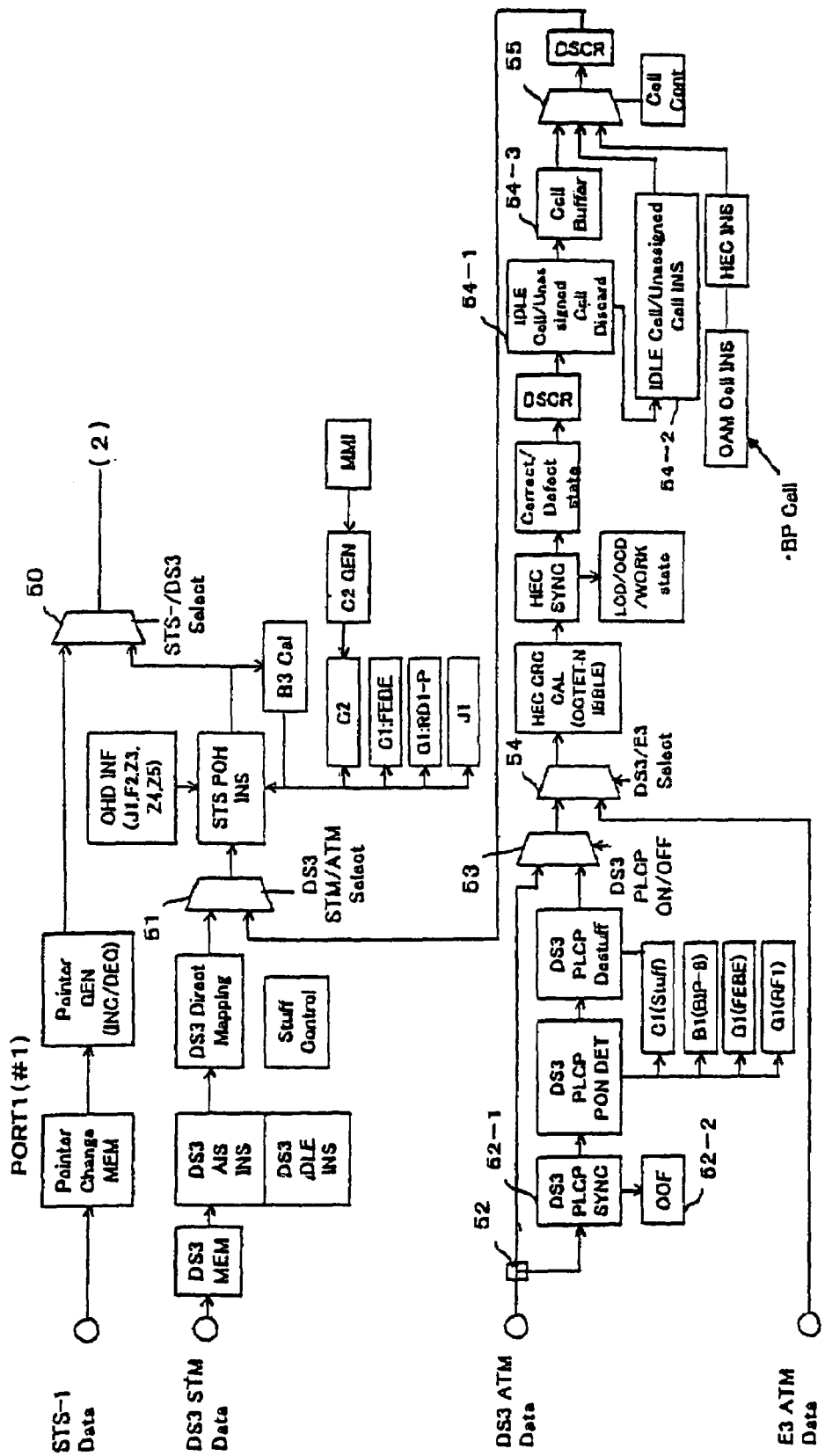
FIG. 6 shows the detailed configuration (3) of the interface device for processing a signal from a downstream network to a SONET in the ATM cell service apparatus according to an embodiment of the present invention.

FIG. 6 shows the configuration of a half of the interface device shown in FIG. 4 on the SONET side.

The STS-1 signal input from the circuit shown in FIG. 4 is input to a pointer change memory Pointer Change MEM. The pointer change memory Pointer Change MEM outputs an STS-1 signal by performing a stuffing/destuffing process to amend the discrepancy between the clock from the downstream network and the clock generated by the interface device. Since the head position of the STS-1 signal is changed by performing the stuffing/destuffing process, the pointer generation unit Pointer GEN increments or decrements the value of the pointer to insert the result in the STS-1 signal. The processed STS-1 signal is output from the selector 50.

When a signal obtained by directly mapping the STM signal in the DS3 is input from the circuit shown in FIG. 4, the bit rate of a signal is converted in the DS3 memory DS3 MEM, and an AIS signal or an idle signal is inserted as necessary by the AIS insertion unit DS3 AIS INS and the idle signal insertion unit DS3 IDLE INS. The direct mapping unit DS3 Direct Mapping and the stuff control unit Stuff Control perform a stuff control process to directly map the DS3 signal in the STS-1 signal. After each byte (J1, F1, Z3, Z4, Z5, C2, G1, and B3) of the overhead is generated in the path overhead insertion unit STS POH INS through a selector 51, it is inserted in a signal from the selector 51 as a path overhead. A C2 byte indicates what type of signal is contained in the payload of the STS-1 frame, and can be set by a user from a man-machine interface MM1 through a block C2 GEN. Thus, a configured STS-1 signal is output through the selector 50.

When a signal DS3 ATM DATA obtained by mapping an ATM cell in the SA3 signal is received as shown in FIG. 4, a process to be performed depends on whether the ATM cell is directly mapped or mapped in a PLCP format at a branch 52. When it is directly mapped, it is output through selectors 53 and 54.

When an ATM cell is mapped in the PLCP format, a PLCP synchronization unit DS3 PLCP SYNC 52-1 detects the synchronization, and an out of frame detection unit 52-2 determines whether or not an out of frame state has occurred. Then, the PLCP path overhead detection unit DS3 PLCP POH DET detects each of the bytes C1, B1, and G1 of the PLCP path overhead, the destuff unit DS3 PLCP Destuff performs a destuffing process, and the signal is transmitted to the subsequent circuit through the selectors 53 and 54. When a LOS DET 42 shown in FIG. 4 determines that a signal has a loss (LOS), when the out of frame detection unit OOF DET 45-2 determines that an out of frame state has occurred in the DS3 signal, when the AIS/BLUE signal detection unit AIS/BLU DET 45-3 detects a signal fault, when the idle signal detection unit IDLE SIGNAL DET 45-4 determines that the currently processed signal is an idle signal, or when the out of frame detection unit OOF 52-2 determines that an out of frame state has occurred, an idle cell or an unassigned cell is mapped by the hardware based on the tables shown in FIGS. 7 and 8 in the DS3 frame from an IDLE CELL/unassigned CELL INS 54-2 through a selector 55. Simultaneously, in any case, the operations of the circuits after each DET (42, 45-2, 45-3, 45-4) and OOF (52-2) through a CELL buffer 54-3 are set in a stop state. Practically, the outputs of the circuits subsequent to the DET (42, 45-2, 45-3, 45-4) and the OOF (52-2) can be forcibly set to L. The tables shown in FIGS. 7 and 8 prescribe the process to be performed when an AIS signal or a BLUE signal is detected and when an ATM cell is mapped in the DS3 signal.

In the E3 format, when an STM cell is mapped, the output shown in FIG. 4 is output to the circuit in the subsequent circuit through the selector 54.

The abnormality of the HEC (header error control) of the signal output from the selector 54 is checked by the HEC check unit HEC CRC CAL. The synchronization state of the HEC is checked by the HEC synchronization unit HEC SYNC and the HEC synchronization state monitor unit LCD/OCD/WORK state. Then, a signal is input to the block correct/defect state. In this block, when the synchronization state of the HEC cannot be maintained, a user can specify the correction of the fault. When the user specifies the correction of the fault, an ATM cell whose HEC synchronization state has been corrected is output from the block. When the user does not specify the correction of the fault, the ATM cell is output as is.

Next, the ATM cell is descrambled, and input to an unassigned cell discard unit IDLE Cell/unassigned Cell Discard. When the ATM cell is an idle cell and an empty cell containing no user data after the above mentioned process, the ATM cell is discarded. When the ATM cell is not discarded, it is temporarily stored in a cell buffer, output, scrambled through the selector 55, and the selector 51 performs the process of the above mentioned STS-1 signal.

When it is determined that the ATM cell is an idle cell or an unassigned cell, an idle cell/unassigned cell insertion unit IDLE Cell/unassigned Cell INS outputs an idle cell and an unassigned cell, and they are output from the selector 55 instead of the discarded cell. Thus, since an idle cell and an unassigned cell obtained as a result of processing a received ATM cell are not output, an idle cell and an unassigned cell not affected by the fluctuation of a clock occurring during the process of an ATM cell can be transmitted. In addition, when it is determined that there has arisen a fault in an ATM cell during each of the above mentioned processes performed when an ATM cell is mapped in a DS3 signal, an idle cell and an unassigned cell insertion unit outputs an idle cell or an unassigned cell. Thus, an idle cell and an unassigned cell not affected by the fluctuation of a clock of the ATM cell processed as described above are output. Therefore, the idle cell and the unassigned cell are transmitted using a stable clock not affected by the fluctuation of the clock generated by transmitting data through a network.

An OAM cell insertion unit OAM Cell INS and an HEC insertion unit HEC INS for an OAM cell output an OAM cell at an instruction of a user when the user maintains a network. When an OAM cell is transmitted for maintenance, an ATM cell containing user data normally transmitted during the operation is not transmitted. Therefore, an OAM cell is output from the selector 55. A BP cell from a BP (back pressure) generator described later is inserted and transmitted instead of an OAM cell.

Figure 9:
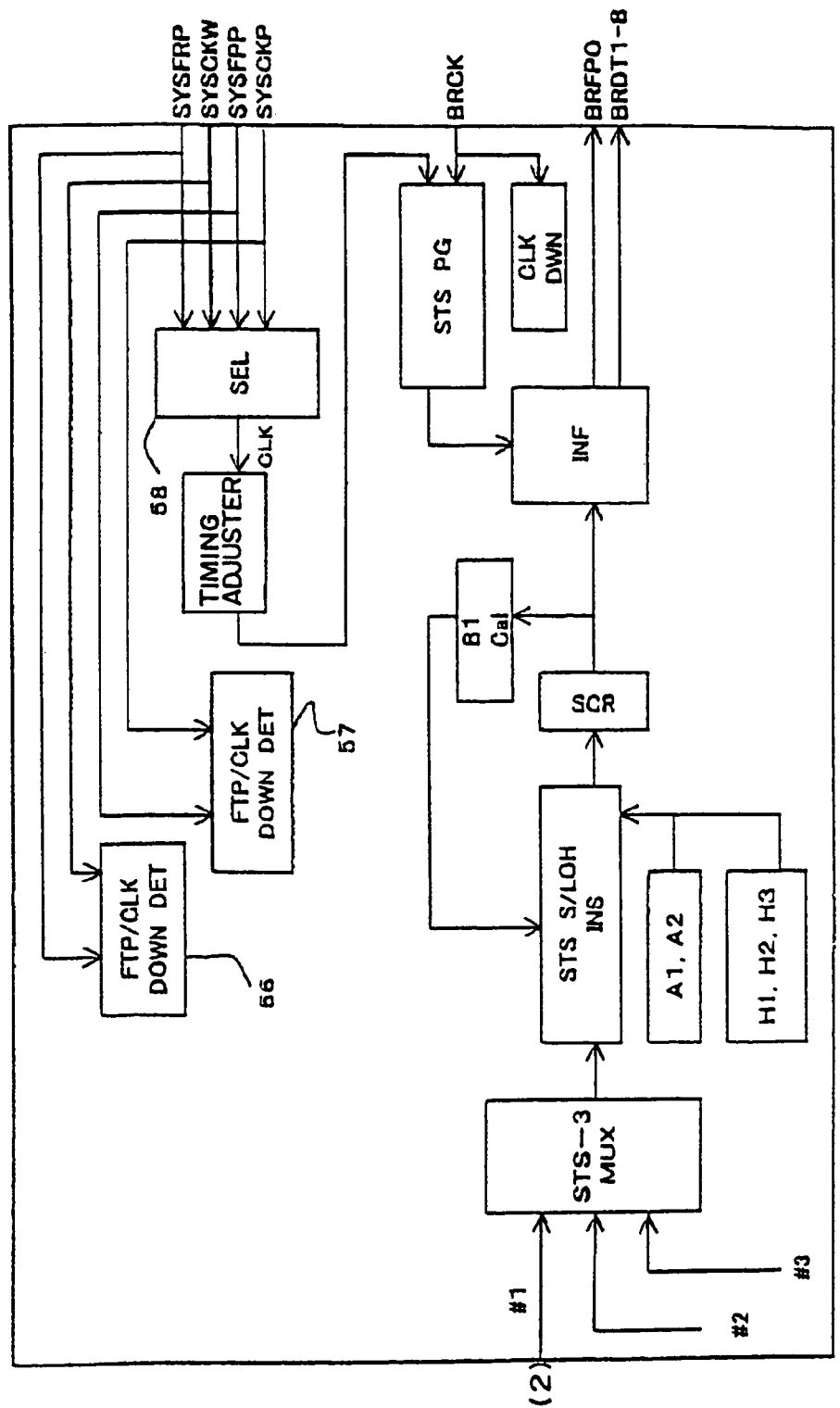
FIG. 9 shows the detailed configuration (4) of the interface device for processing a signal from a downstream network to a SONET in the ATM cell service apparatus according to an embodiment of the present invention.

As described above, an STS-1 signal output from the selector 50 is transmitted to the circuit shown in FIG. 9.

FIG. 9 shows the configuration of the circuit of the transmission unit of a STS-2 signal.

First, an STS-3 multiplexing unit STS-3 MUX inputs 3 channels of 1-channel STS-1 signal described by referring to FIGS. 4 through 6, multiplexes these signals, and generates an STS-3 signal. A section overhead and a line overhead are inserted into the multiplexed STS-3 signal. The resultant signal is scrambled, and is output from the interface unit INF. The interface unit outputs a set of data, that is, a BRDT1-8 (8-bit parallel data) and a frame pulse BRFPO. The frame pulses SYSFPW and SYSFPP of the current system and standby system, and the clock pulses SYSCKW and SYSCKP are input from other modules of the ATM cell service apparatus to the interface device described by referring to FIGS. 4 through 9. Frame pulse/clock down detection units FP/CLK DOWN DET 56 and 57 detect whether or not these signals are down. A selector 58 selects any of the above mentioned clocks, and provides a operation reference clock for the interface device described by referring to FIGS. 4 through 9, and the interface device from an upstream network described later to a downstream network. A timing adjustment unit adjusts the timing discrepancy generated by a propagation time of a clock generated when the clock is distributed to the memory of an interface device, etc. (in FIG. 9, the configuration in which the clock from the selector 58 is distributed to the memory of the interface device, etc. is omitted). The clock is input to an STS pulse generation unit STS PG together with a main clock BRCK of the ATM cell service apparatus storing the interface device according to the present embodiment, used to adjust the phase of the system clock SYSCKW (P) based on the main clock, input to an interface INF, and used as an operation clock for output of data and a frame pulse. The block CLK DWN is a detection unit for determining whether or not the main clock is down.

FIGS. 10 through 14 show the detailed configuration of the downstream interface device for processing a signal from an upstream network to a downstream network of the ATM cell service apparatus according to an embodiment of the present invention.

Figure 10:
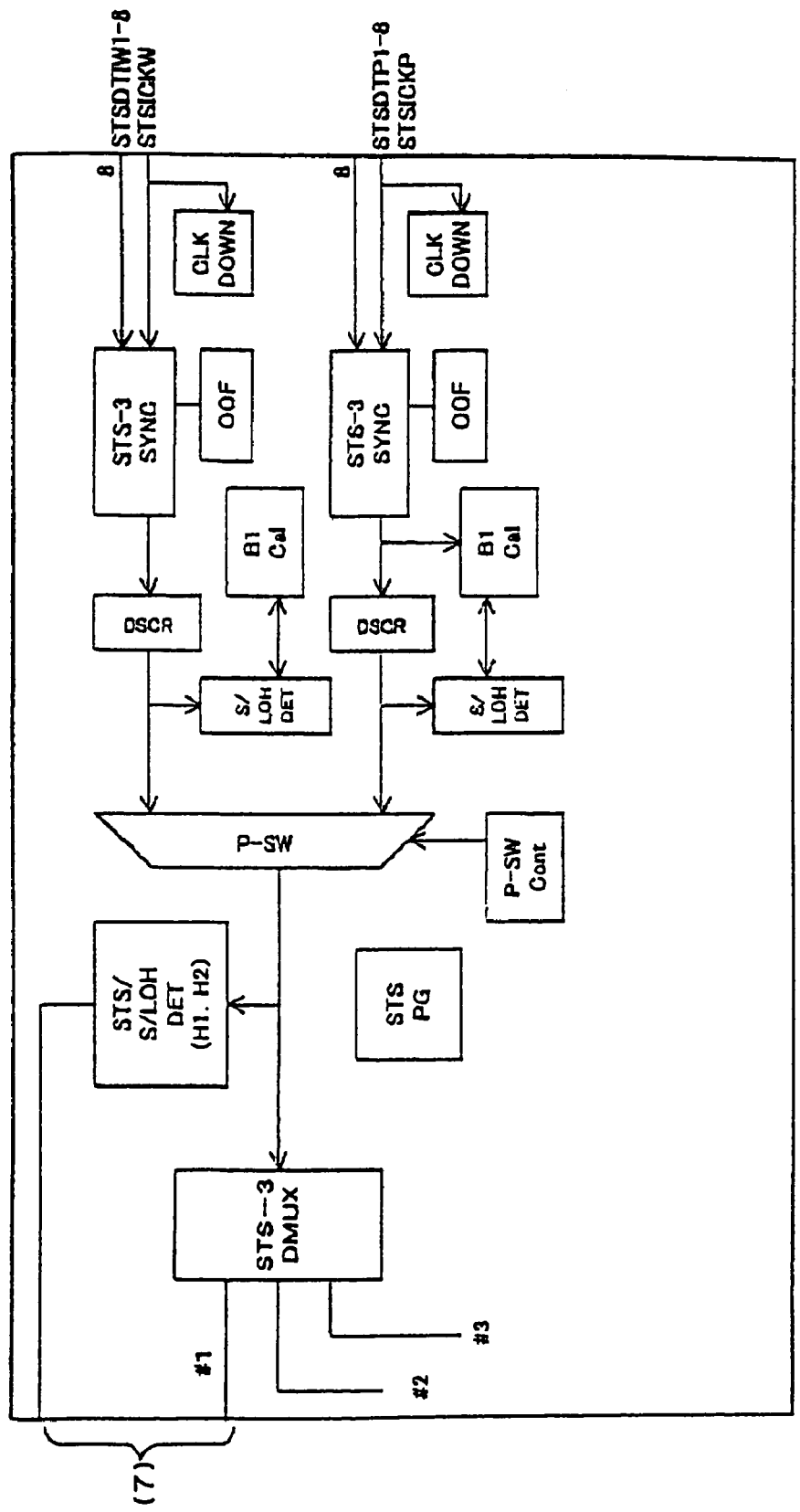
FIG. 10 shows the detailed configuration (1) of the interface device for processing a signal from a SONET to a downstream network in the ATM cell service apparatus according to an embodiment of the present invention.

FIG. 10 shows the configuration of the circuit of the input portion of an STS-3 signal.

As shown in FIG. 10, the current STS-3 data STSDTIW1-8, a clock STS1CKW, standby STS-3 data STSDTIP1 and a clock STS1CKP are input. Data is 8-bit parallel data.

Two blocks CLK DWN are function blocks used for determining whether or not the clocks of the current and standby systems are down. The above mentioned signals are input to STS-3 synchronization units STS-3 SYNC provided in the current and standby systems to determine whether or not there has arisen an out of frame (OOF) state. Then, the signals are respectively input to the B1 byte computation unit B1 Cal and the descrambling unit DSCR. The descrambled signal is input to a section/line overhead detection unit S/LOH DET of the STS-3 signal, and is compared with the computation result of the B1 byte computation unit B1 Cal to determine whether or not there has occurred a bit error. Furthermore, each of the descrambled signals in the current and standby systems is input to a protection switch P-SW, and either the current or the standby system is selected.

Only the H1 and H2 bytes of the signal output from the protection switch P-SW are extracted in the STS section/line overhead detection unit STS S/LOH DET, and the synchronization position of the STS-3 frame is detected. The STS-3 signal transmitted from the protection switch P-SW is demultiplexed into an STS-1 signal by an STS-3 demultiplexing unit STS-3 DMUX, and is transmitted to the circuit of each channel.

A block STS PG was described by referring to FIG. 9.

Figure 11:
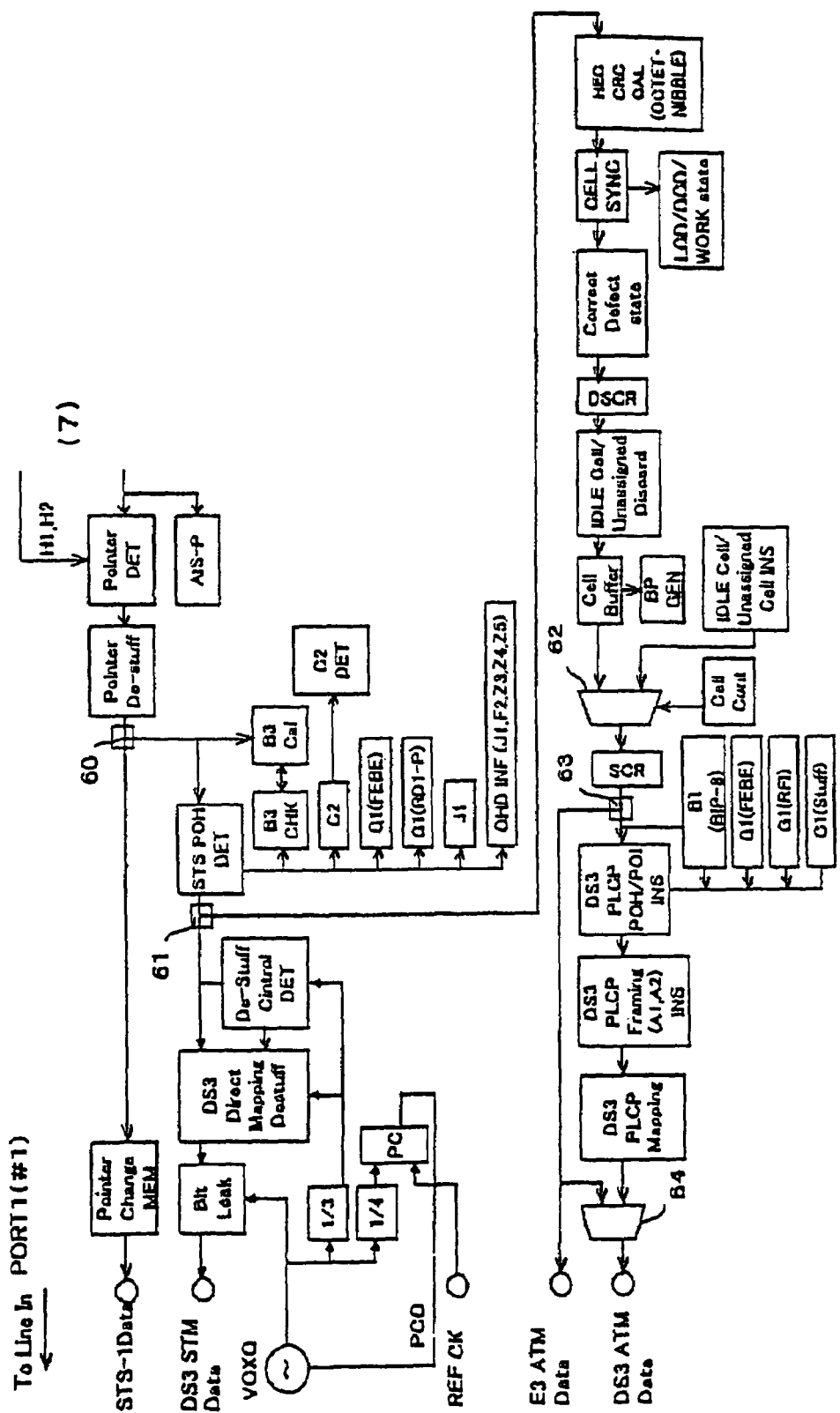
FIG. 11 shows the detailed configuration (2) of the interface device for processing a signal from a SONET to a downstream network in the ATM cell service apparatus according to an embodiment of the present invention.

FIG. 11 shows the configuration of the subsequent circuits shown in FIG. 10.

After converting the signal into an STS-1 signal by the STS-3 demultiplexing unit, a path AIS detection unit AIS-P detects the fault state of the AIS of the path overhead. In addition, the pointer detection unit Pointer DET detects a pointer based on the H1 and H2 bytes detected in FIG. 10, and the pointer destuff unit Pointer De-stuff destuffs a pointer. Then, a branch 60 branches a signal depending on whether the received STS signal is an STS-1 signal itself, or obtained by mapping an STM or an ATM signal.

When a signal is an STS-1 signal itself, the pointer change memory Pointer Change MEM performs a stuffing process.

When a signal is obtained by mapping an STM or an ATM signal, it is input to the B3 computation unit B3 Ca1, and input to the path overhead detection unit STS POH DET of the STS-1. Then, B3 byte, C2 byte, J1 byte, and other bytes are detected.

Then, at a branch 61, an STS signal is branched depending on whether the STS signal has been obtained by mapping an STM signal or by mapping an ATM cell. When the DS3 signal is obtained by mapping an STM signal, it is input to the destuff control detection unit De-Stuff Control DET and the DS3 direct mapping/destuff unit DS3 Direct Mapping Destuff, the STM signal is mapped while destuffing the DS3 signal, and the fluctuation of the bit rate is obtained in the bit leak unit Bit Leak.

A clock from the local oscillator VCXO is directly input to the bit leak unit Bit Leak, and a clock obtained as having ⅓ of the frequency of the clock from the local oscillator VCXO is input to the destuff control detection unit De-Stuff Control DET and the DS3 direct mapping/destuff unit DS3 Direct Mapping Destuff. A signal obtained as having ¼ of the frequency of the clock from the local oscillator VCXO is input to the pulse comparator PC. Similarly, the phase difference between the signal and the reference clock REF CK (BRCK shown in FIG. 9) input to the pulse comparator PC is detected. The phase difference is fed back to the local oscillator VCXO, and adjusted such that a clock constantly having the same phase as the reference clock REF CK can be maintained.

When a signal is obtained by mapping an ATM cell, it is transmitted downward as shown in FIG. 11 at the branch 61. When a signal is obtained by mapping an ATM cell, it is then input to the HEC computation unit HEC CRC CAL. In this example, the CRC computing method can be an OCTET method and a NIBBLE method. The user can select any of these methods. Then, the cell synchronization unit CELL SYNC detects a cell synchronization state. At the next stage (Correct/Defect state), the user can set the synchronization state of an ATM cell as is, or restore the synchronization state. Then, the ATM cell is descrambled, and an idle cell/unassigned cell discard unit IDLE Cell/Unassigned Discard discards the ATM cell when the ATM cell is an idle cell or an empty cell containing no user data.

When the ATM cell is not discarded, it is stored in a cell buffer. At this time, the bit rate is adjusted for a slower speed. However, since the bit rate on the SONET side is low, the buffer can become full because the ATM cell cannot be transmitted from the cell buffer in time. Thus, when the buffer becomes full, the BP generation unit BP GEN generates a back pressure cell, transmits it from the OAM cell insertion unit shown in FIG. 6, and temporarily stops the transmitter transmitting signals.

The ATM cell transmitted from the cell buffer is transmitted to the scrambler through a selector 62, and is then scrambled. If the ATM cell is an idle cell and an unassigned cell, an idle cell/unassigned cell insertion unit IDLE Cell/Unassigned INS inserts an idle cell or an unassigned cell. Thus, an idle cell or an unassigned cell independent of the fluctuation of a clock transmitted together with data through a transmission line can be transmitted. Thus, the inserted idle cell or unassigned cell is output from the selector 62, and is scrambled by a scrambler.

A branch 63 branches the ATM cell depending on whether the mapping format of the ATM cell is the E3 format, the direct map, and the PLCP. When the mapping of the ATM cell is the E3 format, the ATM cell is transmitted as is to the next circuit. When the mapping of the ATM cell is the direct mapping, the ATM cell is input to a selector 64.

When the mapping format of the ATM cell is the PLCP, the ATM cell is input to the POH/POI byte insertion unit DS3 PLCP POH/POI INS, and the B1, G1, and C1 bytes are input to the ATM cell. Furthermore, the framing insertion unit DS3 PLCP Framing INS inserts the leading bytes A1 and A2 of the PLCP frame in the ATM cell. The processed ATM cell is mapped by the mapping unit DS3 PLCP Mapping into the PLCP format, and input to the selector 64.

The selector 64 outputs either the ATM cell of the direct map or the ATM cell of the PLCP format. Then, the ATM cell output from the selector 64 is output to the circuit at the next stage.

Figure 12:
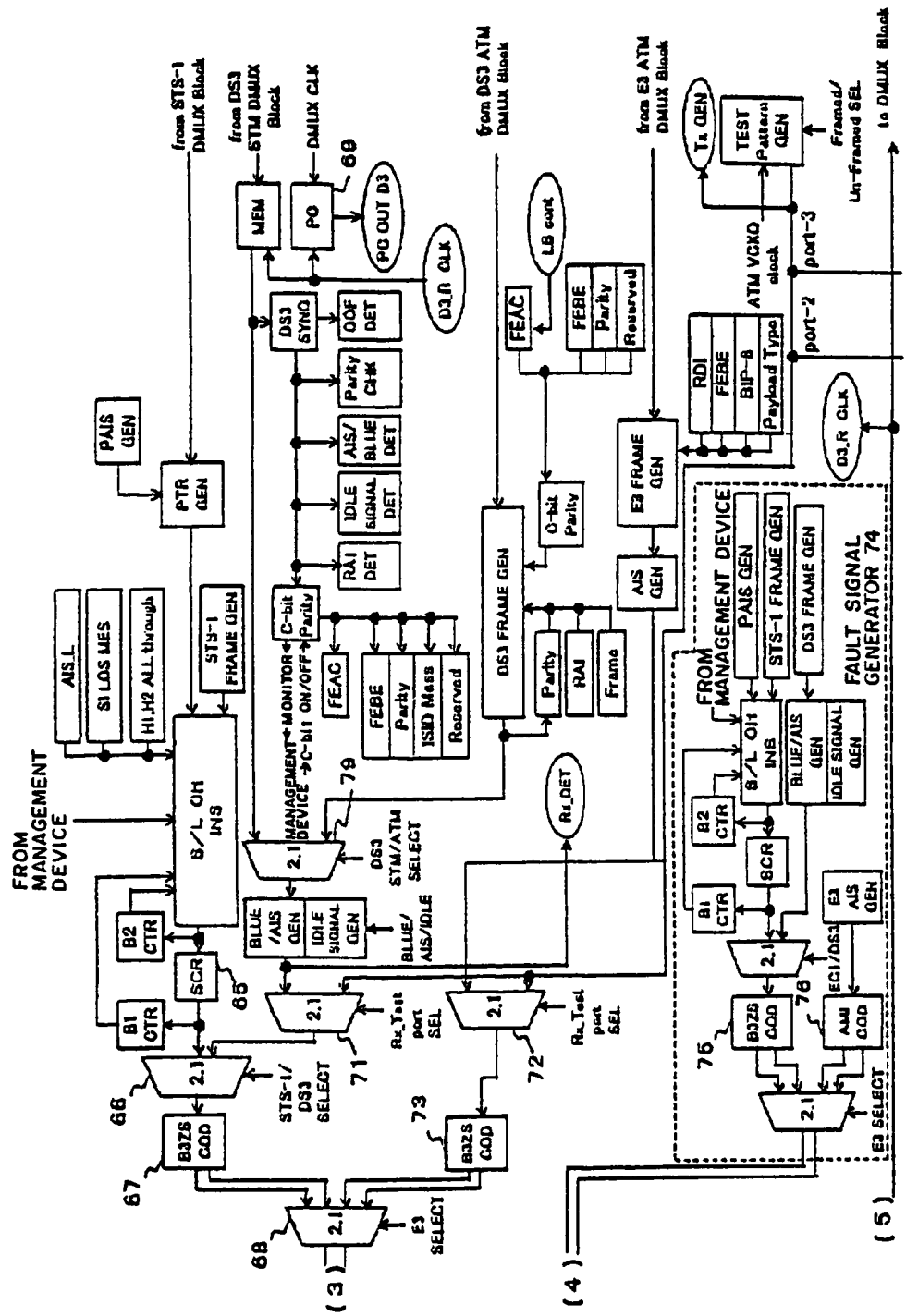
FIG. 12 shows the detailed configuration (3) of the interface device for processing a signal from a SONET to a downstream network in the ATM cell service apparatus according to an embodiment of the present invention.

FIG. 12 shows the configuration of the circuit at the subsequent stage on the downstream side opposite the SONET shown in FIG. 11.

The STS-1 signal input from the circuit shown in FIG. 11 is input to the pointer generation unit PTR GEN to add a pointer and a path AIS byte (generated by the path AIS generation unit PAIS GEN). Then, the STS-1 signal is input to the section/line overhead insertion unit S/LOH INS, put in the STS-1 frame generated by the STS-1 frame generation unit STS-1 FRAME GEN, and receives the B1 and B2 bytes, the AIS_L byte, the S1 byte, and H1 and H2 bytes. Then, the signal is scrambled by a scrambler 65, selected by a selector 66, and encoded by an encoder 67. Then, the encoded signal is selected by a selector 68 and transmitted to an output unit.

A DS3 signal obtained by mapping an STM signal is input to the memory MEM to which a clock from the local oscillator described later is input, and then output after the bit rate is converted. The phase of the local oscillator and the phase of the VCXO shown in FIG. 11 are checked by a pulse comparator PC 69 for consistency. The synchronization of the signal output from the memory MEM is detected by the DS3 synchronization unit DS3 SYNC, and an out of frame state, a parity and AIS/BLUE signal are detected, an idle signal is detected, an opposite station alarm is detected, a C-bit is detected, etc. A signal output from the memory MEM is input to a selector 70 and selected. Then, a BLUE/AIS signal and an idle signal are inserted to the signal by the BLUE/AIS generation unit BLUE/AIS GEN and the idle signal generation unit IDLE SIGNAL GEN as necessary. Then, after a selector 71 selects the signal, the signal is input to the encoder 67 through the selector 68. The signal output from the encoder 67 is output to an output unit through the selector 68.

When the DS3 signal is obtained by mapping an ATM signal, the DS3 frame generation unit DS3 FRAME GEN configures it in the DS3 frame. At this time, a parity bit, an RAI byte, a C-bit, etc. are inserted. A signal configured in the DS3 frame is input to the selector 70, selected, and then transmitted to the output unit as in the case of the DS3 signal obtained by mapping an STM.

The ATM cell in the E3 format is generated in the E3 frame by the E3 frame generator, and the AIS generator AIS GEN inserts an AIS byte in the frame, and the result is input to a selector 72. After the selector 72 selects it, an encoder 73 encodes it and outputs it to the output unit through the selector 68.

The test pattern generation unit TEST Pattern GEN generates a test signal, and transmits it to 3 channels on 1 chip. The test signal is transmitted to the selectors 71 and 72, transmitted from either of them, encoded by the encoder 67 or 73, and output to the output unit through the selector 68.

A fault signal generator 74 generates and outputs a fault signal of each protocol when a signal input from an upstream network is an AIS signal, etc. in a faulty condition. That is, in the case of an STS-1 signal, it generates a PAIS byte, put it in a section/line overhead of the STS-1 frame, scrambles it, encodes it in an encoder 75, and outputs it to the output unit. In the case of a DS3 signal, it generates a DS3 frame, generates a BLUE/AIS byte or an idle signal, inserts it in the DS3 frame, encodes it in the encoder 75, and outputs it to the output unit. In the case of the ATM cell in the E3 format, it generates an AIS in the E3 format, encodes it in an encoder 76, and transmits it to the output unit.

If a signal becomes faulty, the fault signal generator 74 can transmit an AIS signal, etc. using a clock having a stable local oscillator without using a clock transmitted through a network, thereby stabilizing a transmission signal. In addition, the time required before transmitting the AIS signal after a fault occurs can be shortened.

Figure 13:
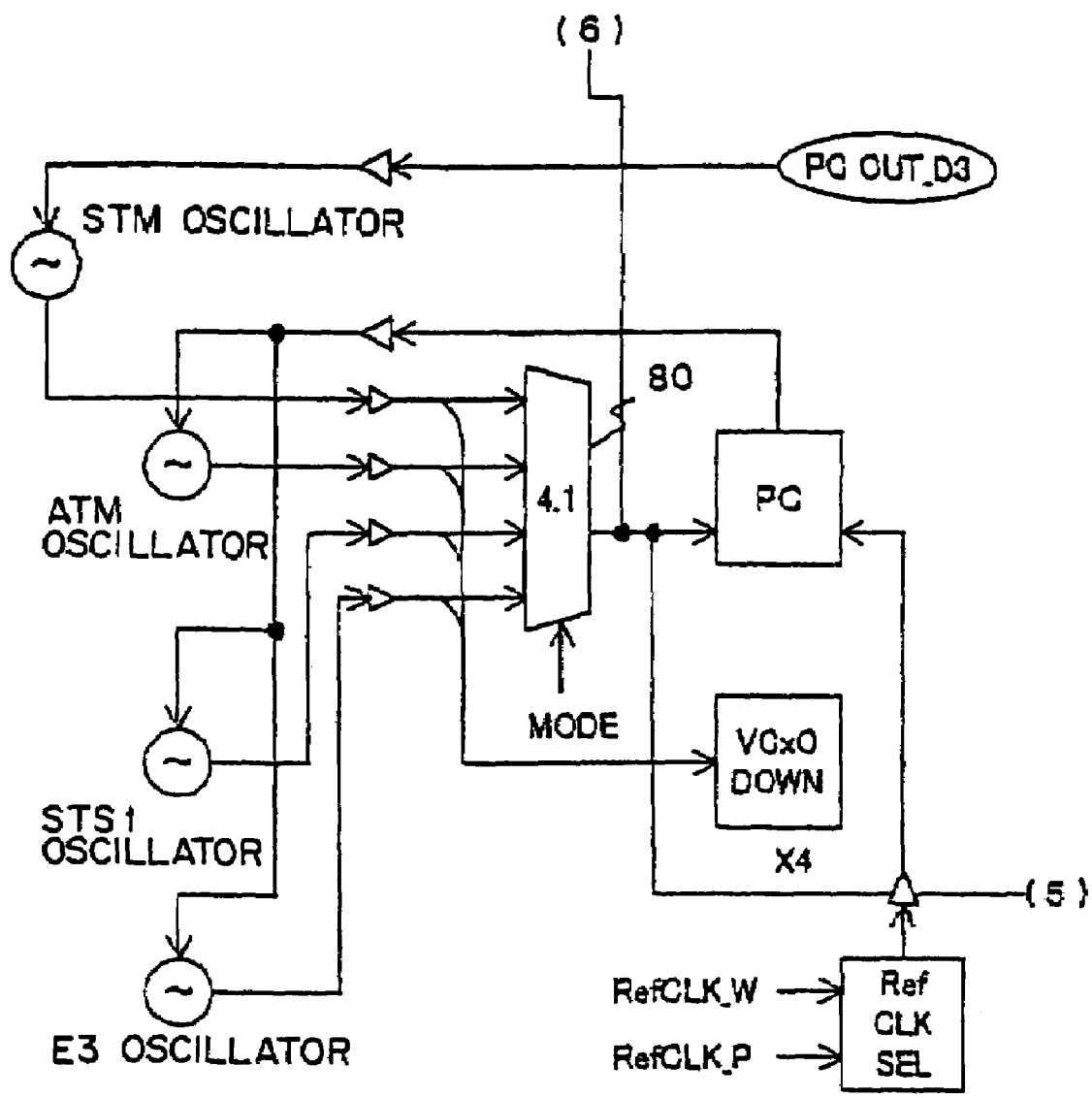
FIG. 13 shows the detailed configuration (4) of the interface device for processing a signal from a SONET to a downstream network in the ATM cell service apparatus according to an embodiment of the present invention.

FIG. 13 shows the configuration of the local oscillator.

In FIG. 13, there are four oscillators, that is, an STM oscillator, an ATM oscillator, an STS1 oscillator, and an E3 oscillator. The outputs of the ATM oscillator, the STS1 oscillator, and the E3 oscillator are input to a selector 80, and the output of the selected oscillator is input to the pulse comparator PC. The pulse comparator PC compares the reference clock obtained from the SONET with the output of the oscillator, and feeds back the value of the generated fluctuation in phase difference, etc. to the oscillator. Thus, the signals from the ATM oscillator, the STS1 oscillator, and the E3 oscillator are stabilized to the reference clock, and a clock signal synchronous with the reference clock is generated. Thus, the generated clock signal is input to the output unit.

On the other hand, the output of the STM oscillator is output from the selector 80, and output from the D3_R CLK shown in FIG. 12 through (5). The terminal is connected to the pulse comparator 69, and the output of the pulse comparator PC is output as PC OUT_D3. The output is input to the oscillation unit shown in FIG. 13, and fed back to the STM oscillator. Therefore, the output of the STM oscillator is maintained in synchronization with the oscillator shown in FIG. 11 for stability. The output of the STM oscillator is transmitted to the output unit as other oscillators.

When there is no output from oscillators, the VCXO DOWN raises an alarm informing that an oscillator has become down.

The signals input through (3) and (4), a selector 85 selects a signal, and outputs it from the output control unit OUT CNT. At this time, the clock signal input through (6) is also output from a selector 87.

Figure 14:
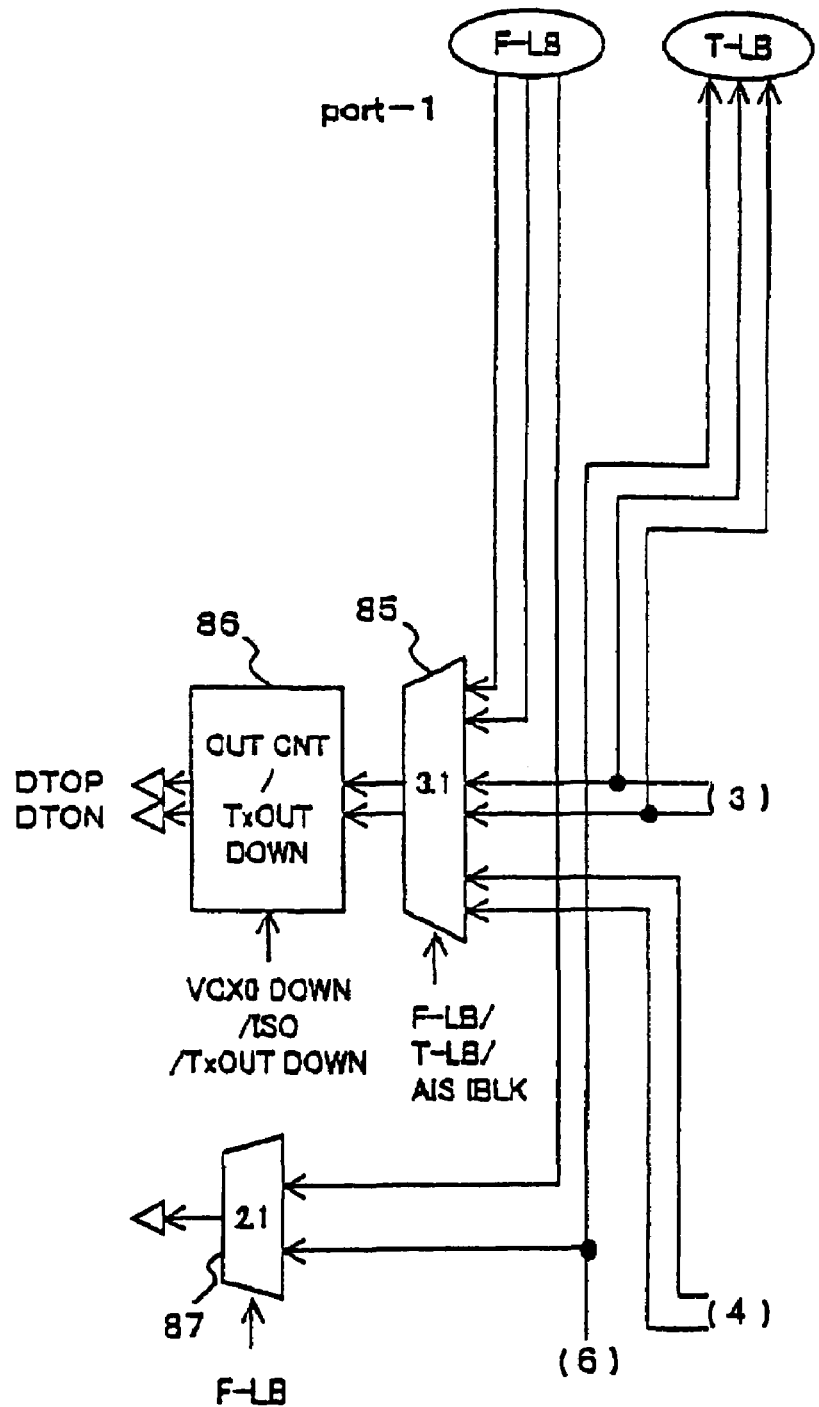
FIG. 14 shows the detailed configuration (5) of the interface device for processing a signal from a SONET to a downstream network in the ATM cell service apparatus according to an embodiment of the present invention.

Furthermore, the T-LB and F-LB shown in FIG. 4 are connected to the output unit shown in FIG. 14, and the signal F-LB is looped back by the output unit, and transmitted as is to the downstream network. The F-LB is looped back by the output unit, and is transmitted as is to the downstream network. The signal T-LB is input from (3), transmitted to the circuit shown in FIG. 4, and transmitted to the SONET through the interface device on the upstream side. Thus, the loop back function can be configured.

The present invention can provide an ATM cell service apparatus capable of directly connecting an ATM cell to a SONET through a DS3 network.

What is claimed is:

1. An ATM cell service apparatus which accommodates an ATM cell in an optical synchronous communications network through an N.A. (North America) asynchronous communications network, comprising:

an optical synchronous communications network signal terminating unit terminating a signal in an optical synchronous communications network;

an N.A. asynchronous communications network signal terminating unit terminating a signal in an N.A. asynchronous communications network;

first and second ATM cell extraction units respectively extracting an ATM cell from a signal of the optical synchronous communications network and a signal of the N.A. asynchronous communications network;

first and second ATM cell mapping units respectively mapping ATM cells respectively extracted said first and second ATM cell extraction units in signals of the N.A. asynchronous communications network and the optical synchronous communications network respectively; and first and second signal transmission units respectively transmitting a signal of the N.A. asynchronous communications network in which the ATM cell is mapped, and a signal of the optical synchronous communications network in which the ATM cell is mapped, wherein when an ATM cell input from an optical synchronous communications network or an N.A. asynchronous communications network is faulty, said first or second signal transmission unit, respectively, generates an ATM cell exclusively informing that a fault has occurred, and transmits the generated ATM cell.

2. The apparatus according to claim 1, further comprising:

an optical synchronous communications network interface unit connecting a signal for an optical synchronous communications network to an optical synchronous communications network; and an ATM network interface unit connecting a signal for an optical synchronous communications network to an ATM network without intervening signal processing units.

3. The apparatus according to claim 1, wherein said extracting second unit extracts an ATM cell from a signal obtained by directly mapping an ATM cell in an N.A. asynchronous communications network signal; and said first extracting unit extracts an ATM cell from a signal obtained by mapping an ATM cell in a predetermined format in the N.A. asynchronous communications network signal.

4. An ATM cell service apparatus which accommodates an ATM cell in an optical synchronous communications network through an N.A. (North America) asynchronous communications network, comprising:

an optical synchronous communications network signal terminating unit terminating a signal in an optical synchronous communications network;

an N.A. asynchronous communications network signal terminating unit terminating a signal in an N.A. asynchronous communications network;

first and second ATM cell extraction units respectively extracting an ATM cell from a signal of the optical synchronous communications network and a signal of the N.A. asynchronous communications network;

first and second ATM cell mapping units respectively mapping ATM cells respectively extracted by said first and second ATM cell extraction units in signals of the N.A. asynchronous communications network and the optical synchronous communications network respectively; and first and second signal transmission units respectively transmitting a signal of the N.A. asynchronous communications network in which the ATM cell is mapped, and a signal of the optical synchronous communications network in which the ATM cell is mapped, wherein said extracting second unit extracts an ATM cell from a signal obtained by directly mapping an ATM cell in an N.A. asynchronous communications network signal; and said first extracting unit extracts an ATM cell from a signal obtained by mapping an ATM cell in a predetermined format in the N.A. asynchronous communications network signal, wherein an amount of hardware can be reduced by sharing a part of the hardware of said first and second extraction units, and wherein said predetermined format is a PLCP (Physical Layer Convergence Protocol).

5. A method of providing an ATM cell service in which an ATM cell is accommodated in an optical synchronous communications network through an N.A. (North America) asynchronous communications network, comprising:

(a) terminating a signal in an optical synchronous communications network;

(b) terminating a signal in an N.A. asynchronous communications network;

(c) extracting an ATM cell from one of a signal of the optical synchronous communications network and a signal of the N.A. asynchronous communications network;

(d) mapping the ATM cell extracted in step (c) in a signal of the other of N.A. asynchronous communications network and the optical synchronous communications network;

and (e) transmitting the signal a in which the ATM cell is mapped, wherein when an ATM cell input from one of an optical synchronous communications network and an N.A. asynchronous communications network is faulty, an ATM cell exclusively informing that a fault has occurred, is generated and the generated ATM cell is transmitted in said step (e).

6. The method according to claim 5, further comprising:

(f) connecting a signal for an optical synchronous communications network to an optical synchronous communications network; and (g) connecting a signal for an optical synchronous communications network to an ATM network without intervening signal processing units.

7. The method according to claim 5, wherein said step (c) comprises:

(h) extracting an ATM cell from a signal obtained by directly mapping an ATM cell in an N.A. asynchronous communications network signal; and (i) extracting an ATM cell from a signal obtained by mapping an ATM cell in a predetermined format in the N.A. asynchronous communications network signal.

* * * * *